US011862838B2

(12) United States Patent
Zhang et al.

(10) Patent No.: US 11,862,838 B2
(45) Date of Patent: Jan. 2, 2024

(54) ELECTRONIC DEVICES HAVING WIDEBAND ANTENNAS

(71) Applicant: Apple Inc., Cupertino, CA (US)

(72) Inventors: Lijun Zhang, San Jose, CA (US); Jiangfeng Wu, San Jose, CA (US); Mattia Pascolini, San Francisco, CA (US); Siwen Yong, San Francisco, CA (US); Yi Jiang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/851,812

(22) Filed: Apr. 17, 2020

(65) Prior Publication Data

US 2021/0328346 A1 Oct. 21, 2021

(51) Int. Cl.

*H01Q 5/10* (2015.01)
*H01Q 5/328* (2015.01)
*H01Q 7/00* (2006.01)

(52) U.S. Cl.

CPC ............... *H01Q 5/10* (2015.01); *H01Q 5/328* (2015.01); *H01Q 7/00* (2013.01)

(58) Field of Classification Search

CPC ............ H01Q 5/10; H01Q 7/00; H01Q 5/328; H01Q 1/50; H01Q 1/48; H01Q 3/34; H01Q 21/0075; H01Q 21/065; H01Q 3/40; H01Q 1/38; H01Q 3/30; H01Q 21/0006; H01Q 21/061; H01P 3/081; H01P 3/088

See application file for complete search history.

(56) References Cited

U.S. PATENT DOCUMENTS

| | | | | |
|---|---|---|---|---|
| 4,495,503 | A | 1/1985 | Morman | |
| 5,929,825 | A | 7/1999 | Niu et al. | |
| 5,969,680 | A | 10/1999 | Tsuru et al. | |
| 6,304,222 | B1 | 10/2001 | Smith et al. | |
| 8,270,914 | B2 | 9/2012 | Pascolini et al. | |
| 8,754,817 | B1 * | 6/2014 | Kuo | H01Q 5/371 343/702 |

(Continued)

FOREIGN PATENT DOCUMENTS

| | | | |
|---|---|---|---|
| CN | 103947039 | A | 7/2014 |
| JP | H08111609 | A | 4/1996 |

(Continued)

*Primary Examiner* — Ab Salam Alkassim, Jr.
*Assistant Examiner* — Bamidele A Jegede
(74) *Attorney, Agent, or Firm* — Treyz Law Group, P.C.; Tianyi He

(57) ABSTRACT

An electronic device may include a curved cover layer and an antenna. The antenna may include a ground and a resonating element on a curved surface of a substrate. The curved surface may have a curvature that matches that of the cover layer. The resonating element may include first, second, and third arms fed by a feed. The first arm and a portion of the ground may form a loop antenna resonating element. The second arm and the first arm may form an inverted-F antenna resonating element, where a portion of the first arm forms a return path to the antenna ground for the inverted-F antenna resonating element. A gap between the first and second arms may form a distributed capacitance. The third arm may form an L-shaped antenna resonating element. The antenna may have a wide bandwidth from below 2.4 GHz to greater than 9.0 GHz.

20 Claims, 6 Drawing Sheets

(56) References Cited

U.S. PATENT DOCUMENTS 8,890,753 B1* 11/2014 Lee .......... H01Q 9/42 343/702
8,907,850 B2 12/2014 Schlub et al.
9,041,619 B2 5/2015 McMilin et al.
9,077,066 B1* 7/2015 Lee .......... H01Q 1/243
9,190,712 B2 11/2015 Hu et al.
9,356,336 B1* 5/2016 Zheng .......... H01Q 7/00
9,711,858 B1* 7/2017 Lee .......... H01Q 9/06
2003/0052824 A1* 3/2003 Ollikainen .......... H01Q 9/0421 343/702
2004/0080457 A1* 4/2004 Guo .......... H01Q 9/0421 343/702
2004/0090377 A1 5/2004 Dai et al.
2004/0108957 A1* 6/2004 Umehara .......... H01Q 5/385 343/702
2004/0145523 A1 7/2004 Shamblin et al.
2004/0257283 A1 12/2004 Asano et al.
2005/0168384 A1* 8/2005 Wang .......... H01Q 9/42 343/702
2005/0270238 A1 12/2005 Jo et al.
2007/0188388 A1* 8/2007 Feng .......... H01Q 9/0421 343/702
2009/0079639 A1* 3/2009 Hotta .......... H01Q 5/378 343/702
2009/0128428 A1 5/2009 Ishizuka et al.
2009/0153407 A1 6/2009 Zhang et al.
2009/0189815 A1* 7/2009 Hotta .......... H01Q 1/243 343/700 MS
2009/0295646 A1* 12/2009 Oh .......... H01Q 9/42 343/702
2009/0295652 A1* 12/2009 Yagi .......... H01Q 9/40 343/702
2010/0149052 A1 6/2010 Nishio et al.
2010/0321253 A1* 12/2010 Ayala Vazquez .......... H01Q 13/18 343/702
2011/0074638 A1 3/2011 Gong et al.
2011/0193754 A1* 8/2011 Schlub .......... H01Q 9/0421 343/702
2011/0260939 A1* 10/2011 Korva .......... H01Q 9/0421 343/725
2012/0001815 A1* 1/2012 Wong .......... H01Q 9/0421 343/843
2012/0007791 A1* 1/2012 Grbic .......... H01P 11/00 343/895
2012/0188134 A1* 7/2012 Hotta .......... H01Q 9/42 343/722
2012/0194390 A1* 8/2012 Endo .......... H01Q 5/364 343/700 MS
2012/0206302 A1* 8/2012 Ramachandran .......... H01Q 1/42 343/866
2012/0242555 A1* 9/2012 Hsieh .......... H01Q 5/378 343/833
2012/0249393 A1* 10/2012 Hotta .......... H01Q 7/00 343/843
2012/0274538 A1* 11/2012 Tsou .......... H01Q 5/371 343/876
2012/0313830 A1* 12/2012 Lee .......... H01Q 1/243 343/729
2013/0016013 A1* 1/2013 Wong .......... H01Q 1/38 343/700 MS
2013/0050036 A1* 2/2013 Kashiwagi .......... H01Q 5/10 343/749
2013/0207861 A1* 8/2013 Huang .......... H01Q 1/2266 343/700 MS
2013/0234903 A1* 9/2013 Kwak .......... H01Q 1/243 343/750
2013/0241777 A1* 9/2013 Chang .......... H01Q 5/371 343/700 MS
2013/0278468 A1* 10/2013 Yehezkely .......... H01Q 21/06 343/702
2014/0009342 A1* 1/2014 Wei .......... H01Q 21/28 343/700 MS
2014/0062796 A1* 3/2014 Chen .......... H01Q 1/243 343/700 MS
2014/0145891 A1* 5/2014 Palevsky .......... H01Q 9/0435 343/746
2014/0232608 A1 8/2014 Zhao
2014/0266936 A1* 9/2014 Emmanuel .......... H01Q 9/42 29/601
2015/0054708 A1* 2/2015 Lin .......... H01Q 9/045 343/846
2015/0097733 A1* 4/2015 Wei .......... H01Q 1/243 343/700 MS
2015/0097753 A1* 4/2015 Liou .......... H01Q 7/00 343/867
2015/0155616 A1* 6/2015 Lin .......... H01Q 9/42 343/702
2015/0171518 A1* 6/2015 Lee .......... H01Q 9/42 343/843
2015/0236417 A1* 8/2015 Iellci .......... H01Q 5/378 343/850
2015/0236422 A1* 8/2015 You .......... H01Q 5/378 343/729
2015/0288074 A1* 10/2015 Harper .......... H01Q 1/24 343/833
2015/0295314 A1* 10/2015 Oh .......... H01Q 21/0006 343/866
2016/0028150 A1* 1/2016 Chou .......... H01Q 1/243 343/702
2016/0043467 A1* 2/2016 Desclos .......... H01Q 5/378 343/745
2016/0111797 A1* 4/2016 Shin .......... H01Q 5/364 343/729
2016/0156102 A1* 6/2016 Azad .......... H01Q 9/04 343/905
2016/0164192 A1* 6/2016 Lin .......... H01Q 5/314 343/749
2016/0254832 A1* 9/2016 Yoo .......... H01Q 5/378 455/575.5
2017/0040702 A1* 2/2017 West .......... H01Q 11/105
2017/0048363 A1 2/2017 Lee et al.
2017/0201011 A1* 7/2017 Khripkov .......... H01Q 1/42
2017/0250459 A1* 8/2017 Kashiwagi .......... H01Q 1/38
2018/0277951 A1* 9/2018 Nishikawa .......... H01Q 5/385
2018/0278287 A1* 9/2018 Nishikawa .......... H01Q 5/335
2019/0067817 A1* 2/2019 Oh .......... H01Q 1/2266
2019/0097301 A1 3/2019 Wu et al.
2019/0214721 A1* 7/2019 Hu .......... H01Q 1/521
2019/0260127 A1* 8/2019 Shi .......... H01Q 5/371
2020/0161745 A1* 5/2020 Khripkov .......... H01Q 13/085
2020/0212598 A1* 7/2020 Gonzalez .......... H01Q 5/48

FOREIGN PATENT DOCUMENTS

WO 2010032066 A1 3/2010
WO 2010137061 A1 12/2010
WO 2014111975 A1 7/2014

* cited by examiner

ELECTRONIC DEVICES HAVING WIDEBAND ANTENNAS

BACKGROUND

This relates to electronic devices, and more particularly, to electronic devices with wireless communications circuitry.

Electronic devices are often provided with wireless communications capabilities. An electronic device with wireless communications capabilities has wireless communications circuitry with one or more antennas. Wireless transceiver circuitry in the wireless communications circuitry uses the antennas to transmit and receive radio-frequency signals.

It can be challenging to form a satisfactory antenna for an electronic device. If care is not taken, the antenna may not perform satisfactorily, may be overly complex to manufacture, or may be difficult to integrate into a device. There is also increasing demand for antennas to handle a greater number of frequency bands. However, space constraints in electronic devices can undesirably limit the bandwidth of the antennas.

SUMMARY

An electronic device may include a housing having a curved dielectric cover layer. The device may include wireless circuitry with an antenna. The antenna may include an antenna ground and an antenna resonating element formed from conductive traces patterned on a curved surface of a dielectric substrate. The curved surface may have a curvature that matches the curvature of the curved dielectric cover layer. This may ensure that a uniform impedance boundary is present between the antenna and the curved dielectric cover layer across the entire lateral area of the antenna resonating element.

The antenna resonating element may include first, second, and third arms that are fed by a single antenna feed. The first arm may be coupled between the antenna feed and the antenna ground. The second arm may extend from the first arm. The first arm and a portion of the antenna ground may form a loop antenna resonating element. The second arm and the first arm may form an inverted-F antenna resonating element, where a portion of the first arm forms a return path to the antenna ground for the inverted-F antenna resonating element. A gap between the second arm and the portion of the first arm may form a distributed capacitance. The distributed capacitance may tune a frequency response of the loop antenna resonating element.

The third arm of the antenna resonating element may form an L-shaped antenna resonating element. The third arm may be coupled to the antenna ground or may be coupled to the loop antenna resonating element. The loop antenna resonating element may resonate in a first frequency band. The inverted-F antenna resonating element may resonate in a second frequency band lower than the first frequency band. The L-shaped antenna resonating element may resonate in a third frequency band that includes frequencies higher than the first frequency band. The antenna may have a relatively wide bandwidth such that the antenna exhibits satisfactory antenna efficiency greater than a threshold antenna efficiency across the entire bandwidth (e.g., from below 2.4 GHz to greater than 9.0 GHz).

DETAILED DESCRIPTION

Figure 1:
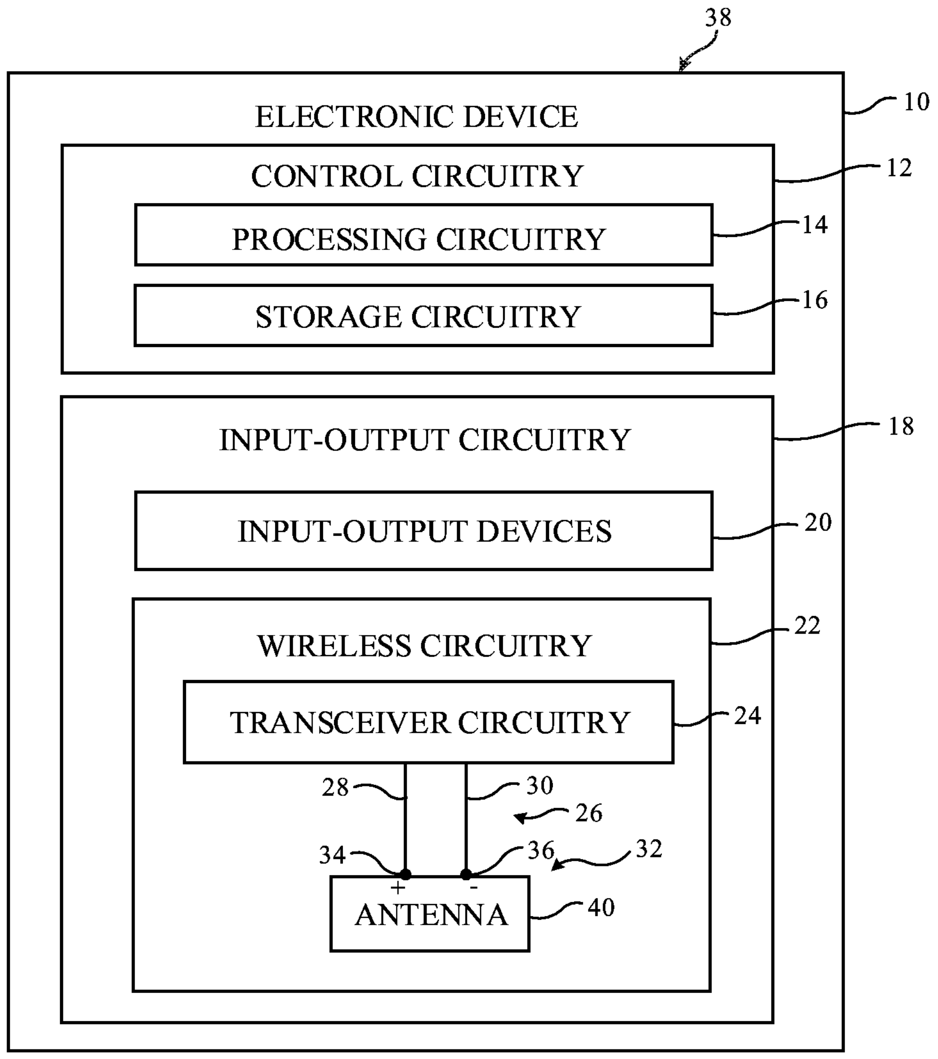
FIG. 1 is a schematic diagram of an illustrative electronic device having an antenna in accordance with some embodiments.

An electronic device such as electronic device 10 of FIG. 1 may be provided with wireless circuitry. The wireless circuitry may include antennas. Electronic device 10 may be a computing device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses, goggles, or other equipment worn on a user's head such as a head mounted (display) device, or other types of wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, a wireless base station or access point, equipment that implements the functionality of two or more of these devices, or other electronic equipment.

As shown in FIG. 1, device 10 may include control circuitry 12. Control circuitry 12 may include storage such as storage circuitry 16. Storage circuitry 16 may include hard disk drive storage, nonvolatile memory (e.g., flash memory or other electrically-programmable-read-only memory configured to form a solid-state drive), volatile memory (e.g., static or dynamic random-access-memory), etc.

Control circuitry 12 may include processing circuitry such as processing circuitry 14. Processing circuitry 14 may be used to control the operation of device 10. Processing circuitry 14 may include on one or more microprocessors, microcontrollers, digital signal processors, host processors, baseband processor integrated circuits, application specific integrated circuits, central processing units (CPUs), etc. Control circuitry 12 may be configured to perform operations in device 10 using hardware (e.g., dedicated hardware or circuitry), firmware, and/or software. Software code for performing operations in device 10 may be stored on storage circuitry 16 (e.g., storage circuitry 16 may include non-transitory (tangible) computer readable storage media that stores the software code). The software code may sometimes be referred to as program instructions, software, data, instructions, or code. Software code stored on storage circuitry 16 may be executed by processing circuitry 14.

Control circuitry 12 may be used to run software on device 10 such as satellite navigation applications, internet browsing applications, voice-over-internet-protocol (VOIP) telephone call applications, email applications, media playback applications, operating system functions, etc. To support interactions with external equipment, control circuitry 12 may be used in implementing communications protocols. Communications protocols that may be implemented using control circuitry 12 include internet protocols, wireless local area network (WLAN) protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols, cellular telephone protocols, MIMO protocols, antenna diversity protocols, satellite navigation system protocols (e.g., global positioning system (GPS) protocols, global navigation satellite system (GLONASS) protocols, etc.), or any other desired communications protocols. Each communications protocol may be associated with a corresponding radio access technology (RAT) that specifies the physical connection methodology used in implementing the protocol.

Device 10 may include input-output circuitry 18. Input-output circuitry 18 may include input-output devices 20. Input-output devices 20 may be used to allow data to be supplied to device 10 and to allow data to be provided from device 10 to external devices. Input-output devices 20 may include user interface devices, data port devices, and other input-output components. For example, input-output devices 20 may include touch sensors, displays (e.g., touch-sensitive displays), light-emitting components such as displays without touch sensor capabilities, buttons (mechanical, capacitive, optical, etc.), scrolling wheels, touch pads, key pads, keyboards, microphones, cameras, buttons, speakers, status indicators, audio jacks and other audio port components, digital data port devices, motion sensors (accelerometers, gyroscopes, and/or compasses that detect motion), capacitance sensors, proximity sensors, magnetic sensors, force sensors (e.g., force sensors coupled to a display to detect pressure applied to the display), etc. In some configurations, keyboards, headphones, displays, pointing devices such as trackpads, mice, and joysticks, and other input-output devices may be coupled to device 10 using wired or wireless connections (e.g., some of input-output devices 20 may be peripherals that are coupled to a main processing unit or other portion of device 10 via a wired or wireless link).

Input-output circuitry 18 may include wireless circuitry 22 to support wireless communications. Wireless circuitry 22 may include radio-frequency (RF) transceiver circuitry 24 formed from one or more integrated circuits, power amplifier circuitry, low-noise input amplifiers, passive RF components, one or more antennas such as antenna 40, transmission lines such as transmission line 26, and other circuitry for handling RF wireless signals. Wireless signals can also be sent using light (e.g., using infrared communications). While control circuitry 12 is shown separately from wireless circuitry 22 in the example of FIG. 1 for the sake of clarity, wireless circuitry 22 may include processing circuitry that forms a part of processing circuitry 14 and/or storage circuitry that forms a part of storage circuitry 16 of control circuitry 12 (e.g., portions of control circuitry 12 may be implemented on wireless circuitry 22). As an example, control circuitry 12 (e.g., processing circuitry 14) may include baseband processor circuitry or other control components that form a part of wireless circuitry 22.

Radio-frequency transceiver circuitry 24 may include wireless local area network transceiver circuitry that handles 2.4 GHz and 5 GHz bands for Wi-Fi® (IEEE 802.11) or other WLAN communications bands and may include wireless personal area network transceiver circuitry that handles the 2.4 GHz Bluetooth® communications band or other WPAN communications bands. If desired, radio-frequency transceiver circuitry 24 may handle other bands such as cellular telephone bands, near-field communications bands (e.g., at 13.56 MHz), millimeter or centimeter wave bands (e.g., communications at 10-300 GHz), and/or other communications bands. If desired, radio-frequency transceiver circuitry 24 may include radio-frequency transceiver circuitry for handling communications in unlicensed bands such as Industry, Science, and Medical (ISM) bands, a frequency band around 6 GHz such as a frequency band that includes frequencies from about 5.925 GHz to 7.125 GHz, or other frequency bands up to about 8-9 GHz.

Radio-frequency transceiver circuitry 24 may also include ultra-wideband (UWB) transceiver circuitry that supports communications using the IEEE 802.15.4 protocol and/or other ultra-wideband communications protocols. Ultra-wideband radio-frequency signals may be based on an impulse radio signaling scheme that uses band-limited data pulses. Ultra-wideband signals may have any desired bandwidths such as bandwidths between 499 MHz and 1331 MHz, bandwidths greater than 500 MHz, etc. The presence of lower frequencies in the baseband may sometimes allow ultra-wideband signals to penetrate through objects such as walls. In an IEEE 802.15.4 system, a pair of electronic devices may exchange wireless time stamped messages. Time stamps in the messages may be analyzed to determine the time of flight of the messages and thereby determine the distance (range) between the devices and/or an angle between the devices (e.g., an angle of arrival of incoming radio-frequency signals). The ultra-wideband transceiver circuitry may operate (i.e., convey radio-frequency signals) in frequency bands such as an ultra-wideband communications band between about 5 GHz and about 8.5 GHz (e.g., a 6.5 GHz UWB communications band, an 8 GHz UWB communications band, and/or at other suitable frequencies). Communications bands may sometimes be referred to herein as frequency bands or simply as "bands."

Wireless circuitry 22 may include one or more antennas such as antenna 40. In general, radio-frequency transceiver circuitry 24 may be configured to cover (handle) any suitable communications (frequency) bands of interest. Radio-frequency transceiver circuitry 24 may convey radio-frequency signals using antennas 40 (e.g., antennas 40 may convey the radio-frequency signals for transceiver circuitry 24). The term "convey radio-frequency signals" as used herein means the transmission and/or reception of the radio-frequency signals (e.g., for performing unidirectional and/or bidirectional wireless communications with external wireless communications equipment). Antennas 40 may transmit the radio-frequency signals by radiating the radio-frequency signals into free space (or to freespace through intervening device structures such as a dielectric cover layer). Antennas 40 may additionally or alternatively receive the radio-frequency signals from free space (e.g., through intervening devices structures such as a dielectric cover layer). The transmission and reception of radio-frequency signals by antennas 40 each involve the excitation or resonance of antenna currents on an antenna resonating element in the antenna by the radio-frequency signals within the frequency band(s) of operation of the antenna.

Antennas such as antenna 40 may be formed using any suitable antenna types. For example, antennas in device 10 may include antennas with resonating elements that are formed from loop antenna structures, patch antenna structures, inverted-F antenna structures, slot antenna structures, planar inverted-F antenna structures, helical antenna structures, monopole antenna structures, strip antenna structures, dipole antenna structures, hybrids of these designs, etc. Parasitic elements may be included in antennas 40 to adjust antenna performance. If desired, antenna 40 may be provided with a conductive cavity that backs the antenna resonating element of antenna 40 (e.g., antenna 40 may be a cavity-backed antenna such as a cavity-backed slot antenna). Different types of antennas may be used for different bands and combinations of bands. For example, one type of antenna may be used in forming a local wireless link antenna and another type of antenna may be used in forming a remote wireless link antenna. In some configurations, different antennas may be used in handling different bands for radio-frequency transceiver circuitry 24. Alternatively, a given antenna 40 may cover one or more bands.

As shown in FIG. 1, radio-frequency transceiver circuitry 24 may be coupled to antenna feed 32 of antenna 40 using transmission line 26. Antenna feed 32 may include a positive antenna feed terminal such as positive antenna feed terminal 34 and may include a ground antenna feed terminal such as ground antenna feed terminal 36. Transmission line 26 may be formed from metal traces on a printed circuit, cables, or other conductive structures. Transmission line 26 may have a positive transmission line signal path such as path 28 that is coupled to positive antenna feed terminal 34. Transmission line 26 may have a ground transmission line signal path such as path 30 that is coupled to ground antenna feed terminal 36. Path 28 may sometimes be referred to herein as signal conductor 28 and path 30 may sometimes be referred to herein as ground conductor 30.

Transmission line paths such as transmission line 26 may be used to route antenna signals within device 10 (e.g., to convey radio-frequency signals between radio-frequency transceiver circuitry 24 and antenna feed 32 of antenna 40). Transmission lines in device 10 may include coaxial cables, microstrip transmission lines, stripline transmission lines, edge-coupled microstrip transmission lines, edge-coupled stripline transmission lines, transmission lines formed from combinations of transmission lines of these types, etc. Transmission lines in device 10 such as transmission line 26 may be integrated into rigid and/or flexible printed circuit boards. In one suitable arrangement, transmission lines such as transmission line 26 may also include transmission line conductors (e.g., signal conductors 28 and ground conductors 30) integrated within multilayer laminated structures (e.g., layers of a conductive material such as copper and a dielectric material such as a resin that are laminated together without intervening adhesive). The multilayer laminated structures may, if desired, be folded or bent in multiple dimensions (e.g., two or three dimensions) and may maintain a bent or folded shape after bending (e.g., the multilayer laminated structures may be folded into a particular three-dimensional shape to route around other device components and may be rigid enough to hold its shape after folding without being held in place by stiffeners or other structures). All of the multiple layers of the laminated structures may be batch laminated together (e.g., in a single pressing process) without adhesive (e.g., as opposed to performing multiple pressing processes to laminate multiple layers together with adhesive).

Filter circuitry, switching circuitry, impedance matching circuitry, and other circuitry may be interposed within the paths formed using transmission lines such as transmission line 26 and/or circuits such as these may be incorporated into antenna 40 (e.g., to support antenna tuning, to support operation in desired frequency bands, etc.). During operation, control circuitry 12 may use radio-frequency transceiver circuitry 24 and antenna(s) 40 to transmit and receive data wirelessly. Control circuitry 12 may, for example, receive wireless local area network communications wirelessly using radio-frequency transceiver circuitry 24 and antenna(s) 40 and may transmit wireless local area network communications wirelessly using radio-frequency transceiver circuitry 24 and antenna(s) 40.

Electronic device 10 may be provided with electronic device housing 38. Housing 38, which may sometimes be referred to as a case, may be formed of plastic, glass, ceramics, fiber composites, metal (e.g., stainless steel, aluminum, etc.), other suitable materials, or a combination of these materials. Housing 38 may be formed using a unibody configuration in which some or all of housing 38 is machined or molded as a single structure or may be formed using multiple structures (e.g., an internal frame structure covered with one or more outer housing layers). Configurations for housing 38 in which housing 38 includes support structures (a stand, leg(s), handles, frames, etc.) may also be used. In one suitable arrangement that is described herein as an example, housing 38 includes a curved dielectric cover layer. Antenna 40 may transmit radio-frequency signals through the curved dielectric cover layer and/or may receive radio-frequency signals through the curved dielectric cover layer.

In practice, the number of frequency bands that are used to convey radio-frequency signals for device 10 tends to increase over time. In some scenarios, device 10 may include a different respective antenna 40 for handling each of these bands. However, increasing the number of antennas 40 in device 10 may consume an undesirable amount of space, power, and other resources in device 10. If desired, a given antenna 40 in device 10 may handle communications in multiple frequency bands to optimize resource consumption within device 10. In one suitable arrangement that is described herein as an example, a given antenna 40 in device 10 may be configured to handle WLAN frequency bands at 2.4 GHz and 5.0 GHz, unlicensed bands around 6 GHz (e.g., between 5.925 and 7.125 GHz), and/or UWB communications bands at 6.5 GHz and 8.0 GHz. However, it can be challenging to provide an antenna 40 with structures that exhibit sufficient bandwidth to cover each of these frequency bands (e.g., from below 2.4 GHz to above 9.0 GHz) with satisfactory antenna efficiency, particularly when the size of the antenna is constrained by the form factor of device 10.

Figure 2:
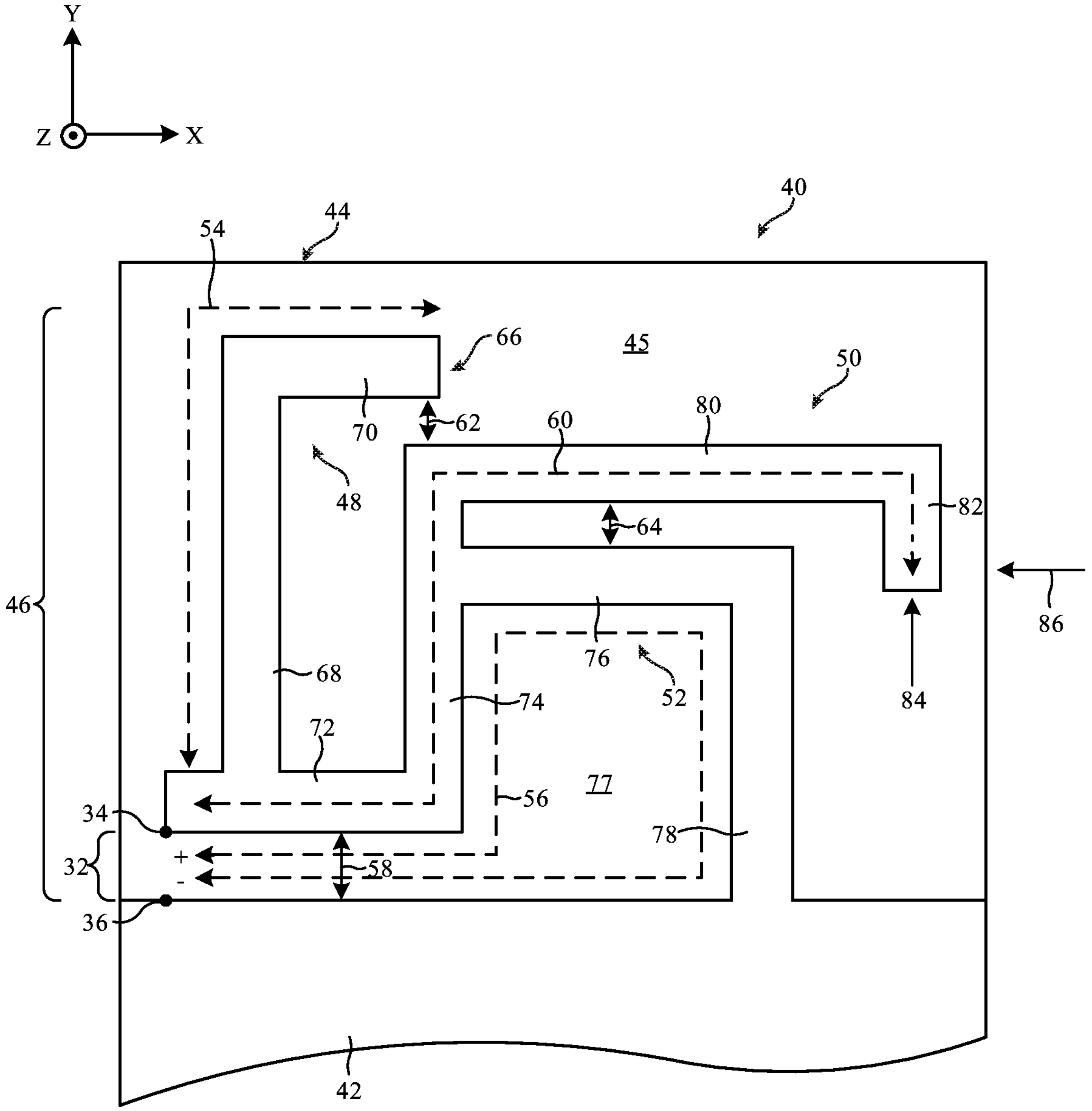
FIG. 2 is a top view of an illustrative wideband antenna having three antenna arms extending from a feed segment in accordance with some embodiments.

FIG. 2 is a diagram of an illustrative antenna 40 that may exhibit a sufficiently wide bandwidth so as to cover each of these frequency bands with satisfactory antenna efficiency. As shown in FIG. 2, antenna 40 may include an antenna resonating element such as antenna resonating element 46 and ground structures such as antenna ground 42. Antenna resonating element 46 may sometimes be referred to herein as antenna radiating element 46 or antenna element 46. Antenna ground 42 may sometimes be referred to herein as ground plane 42 or ground structures 42.

Antenna resonating element 46 and antenna ground 42 may be formed from conductive traces patterned onto a lateral surface such as surface 45 of an underlying dielectric substrate such as dielectric substrate 44. Dielectric substrate 44 may sometimes be referred to herein as dielectric support structure 44, dielectric carrier 44, or antenna carrier 44. Dielectric substrate 44 may be formed from plastic, ceramic, or any other dielectric materials. If desired, antenna ground 42 and/or antenna resonating element 46 may be formed from conductive traces patterned onto a flexible printed circuit that is layered over surface 45 of dielectric substrate 44. Surface 45 may be planar or curved, may have planar and curved portions, or may have any other desired geometry. Examples in which surface 45 is curved are described herein as an example. Surface 45 may be curved in three dimensions about multiple axes if desired (e.g., surface 45 may be spherically curved, aspherically curved, freeform curved, etc.).

Antenna 40 may be fed using antenna feed 32. Antenna feed 32 may be coupled between antenna resonating element 46 and antenna ground 42 (e.g., across gap 58 at surface 45 of dielectric substrate 44). For example, antenna resonating element 46 may have a feed segment such as feed segment 72. Feed segment 72 may extend along a corresponding longitudinal axis (e.g., a longitudinal axis oriented parallel to the X-axis of FIG. 2) and may be separated from antenna ground 42 by gap 58. Positive antenna feed terminal 34 of antenna feed 32 may be coupled to feed segment 72 whereas ground antenna feed terminal 36 is coupled to antenna ground 42 (e.g., at opposing sides of gap 58).

Antenna resonating element 46 may have multiple arms or branches. In the example of FIG. 2, antenna resonating element 46 includes a first arm (branch) 52 extending from feed segment 72, a second arm (branch) 50 extending from first arm 52, and a third arm 48 extending from feed segment 72. Arms 52, 50, and 48 may sometimes be referred to herein as antenna resonating element arms or antenna arms.

As shown in FIG. 2, first arm 52 may have a first segment 74 extending from an end of feed segment 72 (e.g., first segment 74 may have a first end at the end of feed segment 72 that is opposite to antenna feed 32). First segment 74 may extend at a non-parallel angle (e.g., a perpendicular angle) with respect to feed segment 72 (e.g., the longitudinal axis of first segment 74 may extend parallel to the Y-axis of FIG. 2 and perpendicular to the longitudinal axis of feed segment 72). First arm 52 may have a second segment 76 extending from an end of first segment 74 (e.g., first segment 74 may have a second end opposite feed segment 72, and second segment 76 may have a first end at the second end of first segment 74). Second segment 76 may extend at a non-parallel angle (e.g., a perpendicular angle) with respect to first segment 74 (e.g., the longitudinal axis of second segment 76 may extend parallel to the X-axis and feed segment 72, and may extend perpendicular to the longitudinal axis of first segment 74 of FIG. 2). First arm 52 may also have a third segment 78 extending from an end of second segment 76 (e.g., second segment 76 may have a second end opposite first segment 74, and third segment 78 may have a first end at the second end of second segment 76). Third segment 78 may extend at a non-parallel angle (e.g., a perpendicular angle) with respect to second segment 76 (e.g., the longitudinal axis of third segment 78 may extend parallel to the Y-axis and the longitudinal axis of first segment 74 of FIG. 2). Third segment 78 may have a second end opposite second segment 76. The second end of third segment 78 may be coupled to antenna ground 42 (e.g., at a grounding location). This may configure first arm 52 to form a loop-shaped path 56 (with feed segment 72 and antenna ground 42) for antenna currents flowing between positive antenna feed terminal 34 and ground antenna feed terminal 36. Loop-shaped path 56 may run around central opening 77 at surface 45 of dielectric substrate 44.

Second arm 50 may have a first segment 80 extending from the second end of segment 74 of first arm 52 and extending from the first end of segment 76 of first arm 52 (e.g., first segment 80 of second arm 50 may have a first end at the ends of segments 74 and 76 of first arm 52). First segment 80 of second arm 50 may extend parallel to segment 76 of first arm 52 (e.g., first segment 80 of second arm 50 may extend along a longitudinal axis oriented parallel to the longitudinal axis of segment 76 of first arm 52). Second arm 50 may have a second segment 82 extending from an end of first segment 80 to tip 84 of second arm 50 (e.g., first segment 80 may have a second end at second segment 82 of second arm 50). Second segment 82 of second arm 50 may extend at a non-parallel angle with respect to first segment 80 of second arm 50 (e.g., along a longitudinal axis parallel to the Y-axis). First segment 80 of second arm 50 may be separated from segment 76 of first arm 52 (e.g., along the entire length of first segment 80) by gap 64. Second segment 82 of second arm 50 may also be separated from segment 78 of first arm 52 by gap 64 if desired. Gap 64 may form a distributed capacitance along the length of first segment 80 of second arm 50 (e.g., a distributed capacitance between segment 80 of second arm 50 and segment 76 of first arm 52). The distributed capacitance formed by gap 64 may be used to tune the frequency response of first arm 52 and/or second arm 50.

Third arm 48 may have a first segment 68 extending from feed segment 72 (e.g., first segment 68 of third arm 48 may have a first end at feed segment 72). First segment 68 of third arm 48 may extend at a non-parallel angle (e.g., a perpendicular angle) with respect to feed segment 72 (e.g., the longitudinal axis of first segment 68 of third arm 48 may be oriented parallel to the longitudinal axes of segments 74 and 78 of first arm 52 and segment 82 of second arm 50). Third arm 48 may also have a second segment 70 extending from a second end of first segment 68 to tip 66 of third arm 48. Second segment 70 of third arm 48 may extend at a non-parallel angle (e.g., a perpendicular angle) with respect to first segment 68 (e.g., second segment 70 may extend along a longitudinal axis oriented parallel to the longitudinal axes of feed segment 72, segment 76 of first arm 52, and segment 80 of second arm 50). In other words, third arm 48 may be an L-shaped strip (e.g., an L-shaped arm) extending from feed segment 72. A portion of second segment 70 of third arm 48 (e.g., at tip 66) may be separated from second arm 50 by gap 62.

During signal transmission, antenna feed 32 receives radio-frequency signals from radio-frequency transceiver circuitry 24 of FIG. 1. Corresponding (radio-frequency) antenna currents may flow on antenna resonating element 46 and antenna ground 42. The antenna currents may radiate the radio-frequency signals (e.g., as wireless signals) that are transmitted into free space. During signal reception, antenna resonating element 46 may receive (wireless) radio-frequency signals from free space. Corresponding antenna currents are then produced on antenna resonating element 46. The radio-frequency signals corresponding to the antenna currents are then transmitted to radio-frequency transceiver circuitry 24 (FIG. 1) via antenna feed 32.

The lengths of first arm 52, second arm 50, third arm 48, and/or feed segment 72 may be selected so that antenna 40 operates in (handles) desired frequency bands of interest. For example, the length of antenna 40 from positive antenna feed terminal 34 to ground antenna feed terminal 36 through feed segment 72, segments 74, 76, and 78 of first arm 52, and antenna ground 42 (e.g., the length of loop path 56) may be selected to configure antenna resonating element 46 to resonate in a first frequency band. The length of loop path 56 may, for example, be approximately equal to (e.g., within 15% of) one-half of the effective wavelength corresponding to a frequency in the first frequency band. The effective wavelength is equal to a free space wavelength multiplied by a constant value that is determined based on the dielectric constant of dielectric substrate 44. The first frequency band may, for example, include frequencies between about 5.0 GHz and 6.0 GHz (e.g., for conveying signals in a 5.0 GHz wireless local area network band and/or unlicensed frequencies within the first frequency band). The first frequency band may sometimes be referred to herein as the midband of antenna 40.

During signal transmission, antenna currents in the first frequency band may flow along loop path 56 (e.g., along the perimeter of the conductive structures forming loop path 56). Loop path 56 may radiate corresponding (wireless) radio-frequency signals in the first frequency band. Similarly, during signal reception, radio-frequency signals received from free space in the first frequency band may cause antenna currents in the first frequency band to flow along loop path 56. In this way, feed segment 72, segments 74, 76, and 78 of first arm 52, and the portion of antenna ground 42 extending from segment 78 to ground antenna feed terminal 36 may form a loop antenna resonating element for antenna 40 (e.g., first arm 52 may form part of the loop antenna resonating element). If desired, gap 64 may introduce a (distributed) capacitance to loop path 56 that serves to tune the frequency response of loop path 56 in the first frequency band. Increasing the width of gap 64 may decrease this capacitance whereas decreasing the width of gap 64 may increase the capacitance. Gap 64 may, for example, have a width of 0.01-0.10 mm (e.g., approximately 0.05 mm), 0.01-0.50 mm, greater than 0.50 mm, etc.

At the same time, the length of antenna resonating element 46 from positive antenna feed terminal 34 to tip 84 of second arm 50 through feed segment 72, segment 74 of first arm 52, and segments 80 and 82 of second arm 50 (e.g., the length of path 60) may be selected to configure antenna resonating element 46 to resonate in a second frequency band. The length of path 60 may, for example, be approximately equal to (e.g., within 15% of) one-quarter of the effective wavelength corresponding to a frequency in the second frequency band. The second frequency band may, for example, include frequencies below 2.5 GHz (e.g., for conveying signals in a 2.4 GHz wireless local area network band). The second frequency band may sometimes be referred to herein as the low band of antenna 40.

During signal transmission, antenna currents in the second frequency band may flow along path 60 between positive antenna feed terminal 34 and tip 84 (e.g., along the perimeter of the conductive structures forming path 60 of antenna resonating element 46). Path 60 may radiate corresponding (wireless) radio-frequency signals in the second frequency band. Similarly, during signal reception, radio-frequency signals received from free space in the second frequency band may cause antenna currents in the second frequency band to flow along path 60. Segments 76 and 78 of first arm 52 may form a return path to antenna ground 42 for the antenna currents in the second frequency band (e.g., portions of first arm 52 may form a return path to ground for second arm 50 in the second frequency band while concurrently resonating in the first frequency band with the remainder of loop path 56). In this way, second arm 50 and first arm 52 may collectively form an inverted-F antenna resonating element in the second frequency band for antenna 40 (e.g., first arm 52 may form both part of a loop antenna resonating element in the first frequency band and part of an inverted-F antenna resonating element in the second frequency band). If desired, gap 64 may introduce a (distributed) capacitance to second arm 50 that serves to tune the frequency response of path 60 in the second frequency band.

In addition, the length of third arm 48 (e.g., path 54) may be selected to configure antenna resonating element 46 to resonate in a third frequency band. The length of third arm 48 (e.g., path 54) may, for example, be approximately equal to (e.g., within 15% of) one-quarter of the effective wavelength corresponding to a frequency in the third frequency band. The third frequency band may, for example, include frequencies between about 5.0 GHz and 9.0 GHz (e.g., for conveying signals in a 5.0 GHz wireless local area network band, for conveying signals in an unlicensed band such as a frequency band between 5.925 and 7.125 GHz, for conveying signals in a 6.5 GHz UWB communications band, and/or for conveying signals in an 8.0 GHz UWB communications band). The third frequency band may sometimes be referred to herein as the high band of antenna 40. Third arm 48 may sometimes be referred to herein as the high band arm of antenna 40. Second arm 50 may sometimes be referred to herein as the low band arm of antenna 40. First arm 52 may sometimes be referred to herein as the midband arm of antenna 40.

During signal transmission, antenna currents in the third frequency band may flow along path 54 between positive antenna feed terminal 34 and tip 66 (e.g., along the perimeter of the conductive structures forming third arm 48). Third arm 48 (e.g., path 54) may radiate corresponding (wireless) radio-frequency signals in the third frequency band. Similarly, during signal reception, radio-frequency signals received from free space in the third frequency band may cause antenna currents in the third frequency band to flow along path 54. In this way, third arm 48 may form a monopole antenna resonating element (e.g., an L-shaped antenna resonating element) in the third frequency band for antenna 40. If desired, gap 62 may introduce a capacitance to third arm 48 that serves to tune the frequency response of third arm 48 and/or that serves to perform impedance matching for third arm 48 in the third frequency band.

When configured in this way, antenna 40 may convey (e.g., transmit and/or receive) radio-frequency signals in each of the first, second, and third frequency bands with satisfactory antenna efficiency. Antenna 40 may, for example, exhibit a wideband response and may exhibit satisfactory antenna efficiency from the lower limit of the second frequency band to the upper limit of the third frequency band (e.g., from below 2.4 GHz to over 9.0 GHz). The example of FIG. 2 in which third arm 48 extends from feed segment 72 of antenna resonating element 46 is merely illustrative. In another suitable arrangement, feed segment 72 may be omitted and third arm 48 may extend from antenna ground 42.

Figure 3:
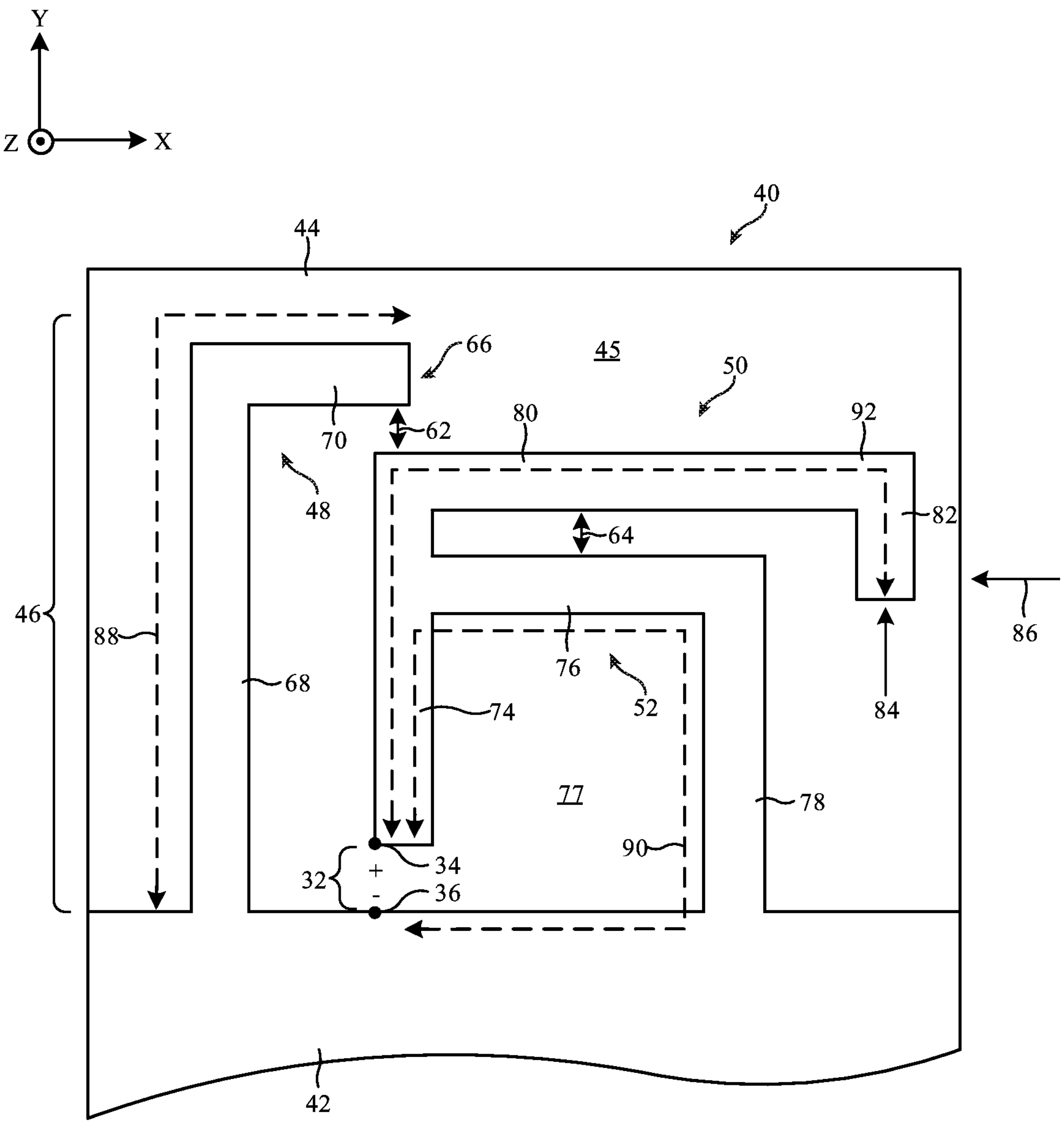
FIG. 3 is a top view of an illustrative wideband antenna having first and second arms extending from a feed and a third arm that extends from an antenna ground in accordance with some embodiments.

FIG. 3 is a diagram showing how third arm 48 of antenna 40 may extend from antenna ground 42. As shown in FIG. 3, feed segment 72 of FIG. 2 may be omitted and positive antenna feed terminal 34 may be coupled to the first end of segment 74 of first arm 52. Segments 74, 76, and 78 of first arm 52 and the segment of antenna ground 42 from segment 78 to ground antenna feed terminal 36 may form loop path 90. The length of antenna resonating element 46 from positive antenna feed terminal 34 to ground antenna feed terminal 36 through first arm 52 and antenna ground 42 (e.g., the length of loop path 90) may be selected to configure antenna resonating element 46 to resonate in the first frequency band. In this way, first arm 52 and the portion of antenna ground 42 extending from segment 78 to ground antenna feed terminal 36 (e.g., loop path 90) may form a loop antenna resonating element for antenna 40 that resonates in the first frequency band.

The length of antenna resonating element 46 from positive antenna feed terminal 34 to tip 84 of second arm 50 through segment 74 of first arm 52 and through second arm 50 (e.g., the length of path 92) may be selected to configure antenna resonating element 46 to resonate in the second frequency band. Segments 76 and 78 of first arm 52 may form a return path to antenna ground 42 for antenna currents in the second frequency band on second arm 50 (e.g., portions of first arm 52 may form a return path to ground for second arm 50 in the second frequency band while concurrently resonating in the first frequency band with the remainder of loop path 90). In this way, second arm 50 and first arm 52 may collectively form an inverted-F antenna resonating element in the second frequency band for antenna 40 (e.g., first arm 52 may form both part of a loop antenna resonating element in the first frequency band and part of an inverted-F antenna resonating element in the second frequency band). Gap 64 may introduce a distributed capacitance that serves to tune the frequency response of loop path 90 in the first frequency band and/or that serves to tune the frequency response of path 92 in the second frequency band.

As shown in FIG. 3, segment 68 of third arm 48 may be coupled to antenna ground 42 (at a grounding location) located at the side of antenna feed 32 opposite to segment 78 of first arm 52 (e.g., antenna feed 32 may be laterally interposed between segment 68 and segment 78 on dielectric substrate 44). The length of third arm 48 (e.g., path 88) may be selected to configure antenna resonating element 46 to resonate in the third frequency band. If desired, gap 62 may introduce a capacitance to third arm 48 that serves to tune the frequency response of third arm 48 and/or that serves to perform impedance matching for third arm 48 in the third frequency band. Antenna feed 32 may, for example, indirectly feed antenna currents in the third frequency band for third arm 48 via near-field electromagnetic coupling (e.g., across gap 62).

Figure 4:
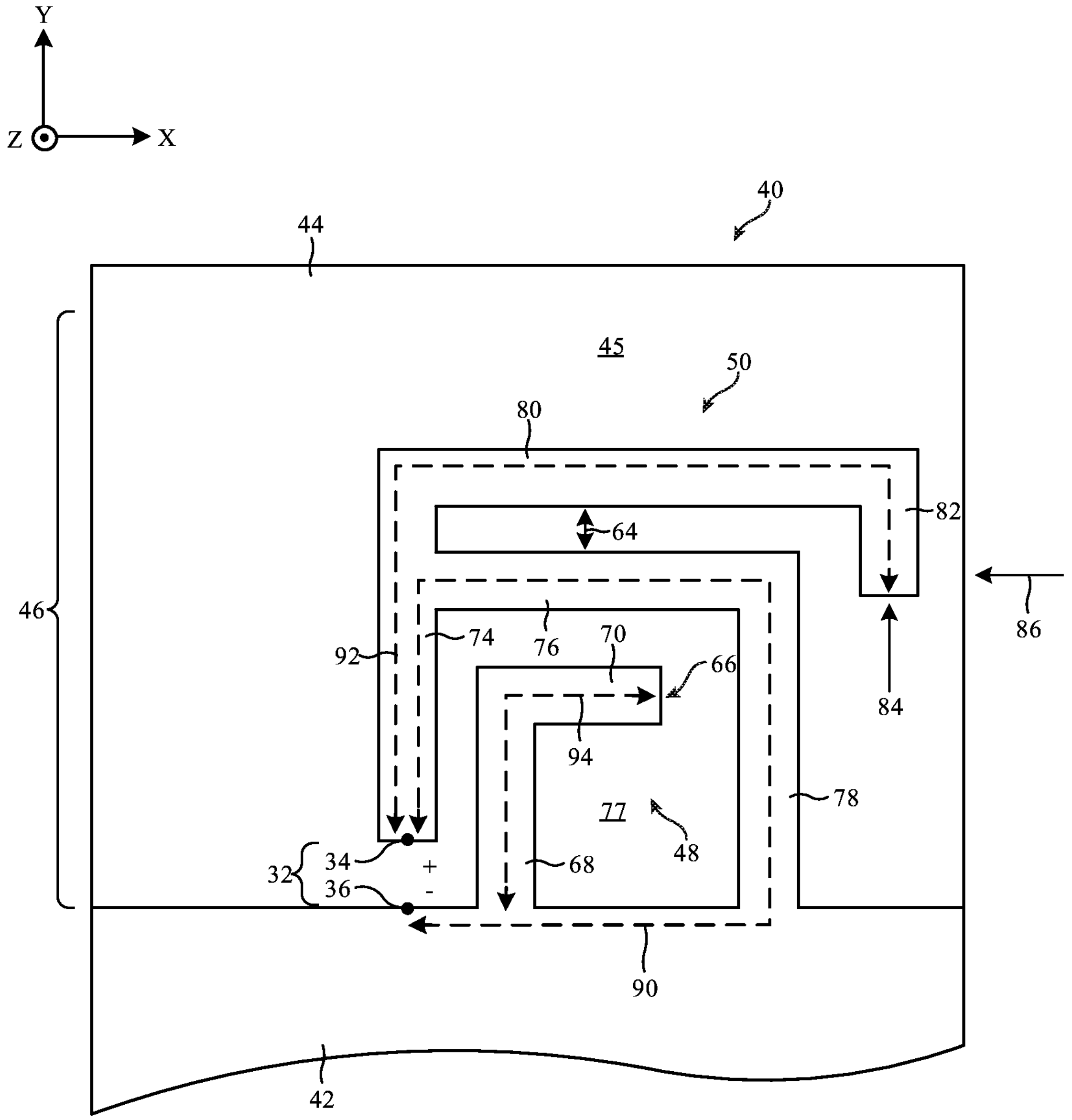
FIG. 4 is a top view of an illustrative wideband antenna having first and second arms extending from a feed and a third arm that is coupled to an antenna ground and that is interposed between the first and second arms and the antenna ground in accordance with some embodiments.

The example of FIG. 3 in which antenna feed 32 is interposed between third arm 48 and segment 78 of first arm 52 is merely illustrative. In another suitable arrangement, third arm 48 may be located within central opening 77 of first arm 52. FIG. 4 is a diagram showing how third arm 48 may be located within central opening 77 of first arm 52.

As shown in FIG. 4, segment 68 of third arm 48 may be coupled to antenna ground 42 at a location that is laterally interposed between antenna feed 32 and segment 78 of first arm 52 (e.g., third arm 48 may be located within central opening 77 of first arm 52). The length of third arm 48 (e.g., path 94) may be selected to configure antenna resonating element 46 to resonate in the third frequency band. In the examples of FIGS. 2-4, all three of arms 52, 50, and 48 share the same antenna feed 32 (e.g., antenna feed 32 feeds radio-frequency signals for each of arms 52, 50, and 48). Antenna feed 32 conveys the radio-frequency signals for each of arms 52, 50, and 48 between antenna 40 and transceiver circuitry 24 (FIG. 1) (e.g., antenna feed 32 transmits radio-frequency signals that are received by arms 52, 50, and 48 from free space to transceiver circuitry 24 and antenna feed 32 transmits radio-frequency signals that are received from transceiver circuitry 24 over arms 52, 50, and 48). The examples of FIGS. 2-4 are merely illustrative. In general, first arm 52, second arm 50, and third arm 48 may have other shapes following any desired paths (e.g., paths having any desired number of curved and/or straight segments and that extend at any desired angles). The edges of the conductive material in antenna resonating element 46 may have any desired shape (e.g., may include any desired number of straight and/or curved portions extending at any desired angles). Antenna resonating element 46 may cover additional frequency bands if desired.

Figure 5:
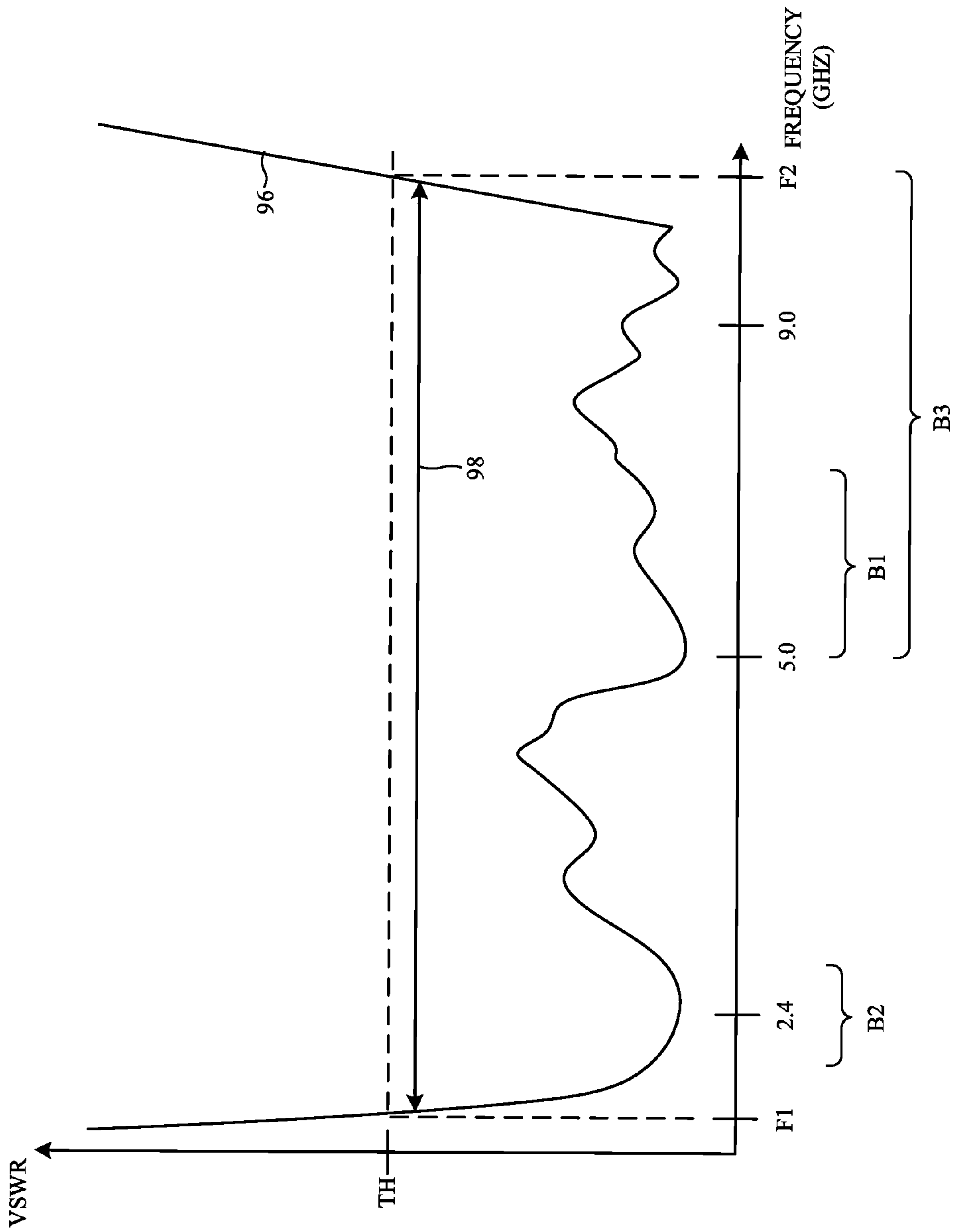
FIG. 5 is a plot of antenna performance (voltage standing wave ratio) as a function of frequency for an antenna of the type shown in FIGS. 2-4 in accordance with some embodiments.

FIG. 5 is a plot of antenna performance as a function of frequency for antenna 40 of FIGS. 2-4. As shown in FIG. 5, curve 96 plots antenna performance (e.g., voltage standing wave ratio (VSWR)) as a function of frequency for antenna 40. As shown by curve 96, antenna 40 may exhibit response peaks that are below a threshold VSWR value TH from a first frequency F1 to a second frequency F2. Frequency F1 may, for example, be less than 2.4 GHz. Frequency F2 may, for example, be greater than 9.0 GHz. Antenna 40 may exhibit satisfactory antenna efficiency at each frequency for which the VSWR of the antenna is below threshold value TH. Antenna 40 may therefore exhibit satisfactory antenna efficiency across bandwidth 98 from frequency F1 to frequency F2.

For example, as shown by curve 96, antenna 40 may exhibit a response peak in first frequency band B1 between about 5.0 GHz and 6.0 GHz due to the contribution (resonance) of first arm 52 of FIGS. 2-4. Antenna 40 may also exhibit a response peak in second frequency band B2 at 2.4 GHz due to the contribution (resonance) of second arm 50 (and first arm 52 in serving as a return path for second arm 50). Similarly, antenna 40 may exhibit a response peak in third frequency band B3 between about 5.0 GHz and 9.0 GHz due to the contribution (resonance) of third arm 48. At the same time, antenna 40 may exhibit satisfactory antenna efficiency at other frequencies across bandwidth 98. This may allow antenna 40 to also convey radio-frequency signals at any other desired frequency bands between frequencies F1 and F2 with satisfactory antenna efficiency, while also occupying a relatively small amount of space within device 10. The example of FIG. 5 is merely illustrative. Curve 96 may have other shapes. Antenna 40 may convey radio-frequency signals in any desired number of frequency bands at any desired frequencies.

Figure 6:
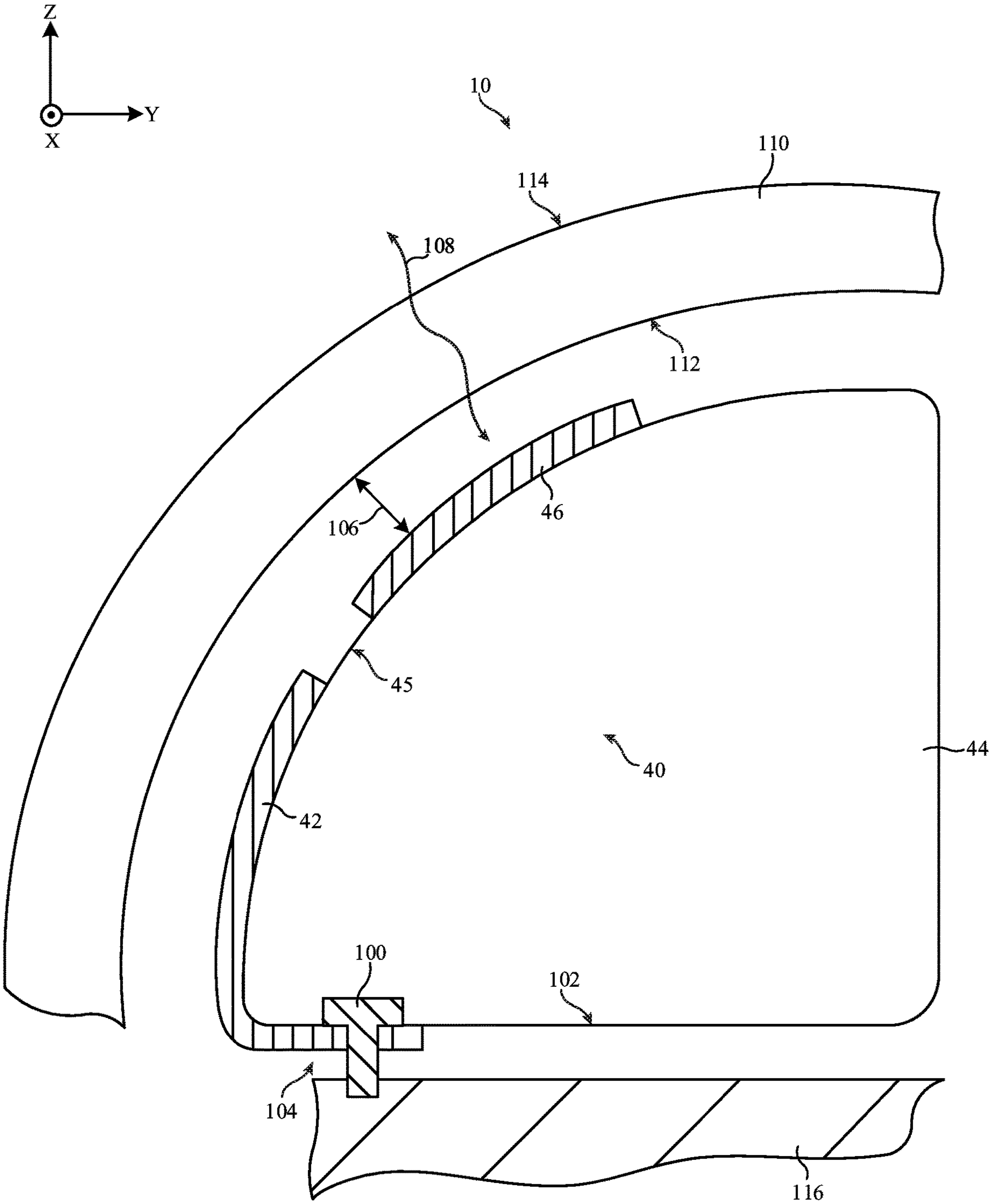
FIG. 6 is a cross-sectional side view showing how an antenna of the type shown in FIGS. 2-4 may be integrated within an illustrative electronic device in accordance with some embodiments.

FIG. 6 is a cross-sectional side view (e.g., as taken in the direction of arrow 86 of FIGS. 2-4) showing how antenna 40 may be integrated into device 10. As shown in FIG. 6, dielectric substrate 44 may have a curved surface such as surface 45 and at least one additional surface such as bottom surface 102. Antenna resonating element 46 may be formed from conductive traces patterned onto surface 45 of dielectric substrate 44. Antenna ground 42 may be formed from conductive traces patterned onto surface 45 and bottom surface 102 of dielectric substrate 44. The conductive traces of antenna ground 42 and antenna resonating element 46 may be patterned onto dielectric substrate 44 using a Laser Direct Structuring (LDS) process if desired (e.g., dielectric substrate 44 may be formed from an LDS plastic material). In another suitable arrangement, antenna ground 42 and antenna resonating element 46 may be patterned onto one or more flexible printed circuits that are layered onto surfaces 45 and 102 of dielectric substrate 44.

Antenna ground 42 and dielectric substrate 44 may include a hole or opening such as hole 104. A fastening structure such as screw 100 may extend through hole 104 to secure antenna ground 42 and dielectric substrate 44 to other device components such as system ground 116. Screw 100 may be a conductive screw that serves to short antenna ground 42 to system ground 116 (e.g., system ground 116 may form part of the ground plane for antenna 40). Screw 100 may be replaced by any desired conductive fastening structures such as a conductive clip, a conductive spring, a conductive pin, a conductive bracket, conductive adhesive, welds, solder, combinations of these, etc.

Device 10 may include a dielectric cover layer such as dielectric cover layer 110. Dielectric cover layer 110 may form part of housing 38 of FIG. 1 for device 10. Dielectric cover layer 110 may have an interior surface 112 at the interior of device 10 and may have an exterior surface 114 at the exterior of device 10. Interior surface 112 and/or exterior surface 114 may be curved surfaces (e.g., three-dimensional curved surfaces that are curved along any desired axes such as spherically curved surfaces, aspherically curved surfaces, freeform curved surfaces, etc.). Interior surface 112 and exterior surface 114 may have the same curvature if desired. Dielectric cover layer 110 may be formed from any desired dielectric materials such as plastic, ceramic, rubber, glass, wood, fabric, sapphire, combinations of these or other materials, etc.

Dielectric substrate 44 may be mounted within device 10 such that surface 45 faces dielectric cover layer 110. Antenna resonating element 46 may be separated from interior surface 112 of dielectric cover layer 110 by distance 106. Antenna 40 may convey radio-frequency signals 108 through dielectric cover layer 110. Surface 45 of dielectric substrate 44 may be curved. The curvature of surface 45 may be selected to match the curvature of interior surface 112 of dielectric cover layer 110 (e.g., surface 45 may be a three-dimensional curved surface that is curved along any desired axes such as a spherically curved surface, aspherically curved surface, freeform curved surface, etc.). In other words, an entirety of the lateral area of surface 45 overlapping antenna resonating element 46 may extend parallel to the portion of interior surface 112 overlapping antenna resonating element 46. This configures antenna resonating element 46 to be separated from interior surface 112 by the same distance 106 across the entire lateral area of antenna resonating element 46 (e.g., across the lateral area of at least arms 52, 50 and 70). This may ensure that a uniform impedance transition is provided from antenna resonating element 46 through dielectric cover layer 110 and to free space across the entire lateral area of antenna resonating element 46. This may serve to maximize the antenna efficiency for antenna 40 despite the presence of a curved impedance boundary such as dielectric cover layer 110.

The foregoing is merely illustrative and various modifications can be made to the described embodiments. The foregoing embodiments may be implemented individually or in any combination.

What is claimed is:

1. An electronic device comprising:

a dielectric substrate having a surface;

an antenna ground on the surface;

a first antenna arm on the surface and coupled to the antenna ground at a grounding location;

a second antenna arm on the surface and extending from the first antenna arm;

an antenna feed coupled to the antenna ground and configured to feed the first and second antenna arms, wherein:

the first antenna arm and a portion of the antenna ground extending between the grounding location and the antenna feed form a loop path that is configured to convey radio-frequency signals in a first frequency band, the second antenna arm is configured to convey radio-frequency signals in a second frequency band, and a portion of the first antenna arm forms a return path to the antenna ground for the second antenna arm;

a gap between the second antenna arm and the portion of the first antenna arm, wherein the gap forms a distributed capacitance that is configured to tune a frequency response of the first antenna arm in the first frequency band; and a dielectric cover layer having a curved interior surface, wherein the first and second antenna arms are configured to radiate through the dielectric cover layer, the surface comprises a curved surface, the first and second antenna arms are disposed between the curved surface of the dielectric substrate and the curved interior surface of the dielectric cover layer, and the curved surface is separated from the curved interior surface by a uniform distance across a lateral area of the first and second antenna arms.

2. The electronic device of claim 1, further comprising:

a third antenna arm configured to convey radio-frequency signals in a third frequency band, wherein the antenna feed is configured to feed the third antenna arm.

3. The electronic device of claim 2, further comprising:

a conductive trace on the surface, wherein the first antenna arm extends from the conductive trace to the grounding location, the third antenna arm extends from the conductive trace, and the antenna feed is coupled between the antenna ground and the conductive trace.

4. The electronic device of claim 3, wherein the first antenna arm comprises a first segment extending from the conductive trace along a first longitudinal axis, the second antenna arm comprises a second segment that extends from the first segment, the second segment extends along a second longitudinal axis that is non-parallel with respect to the first longitudinal axis, the third antenna arm comprises a third segment that extends from the conductive trace, and the third segment extends along a third longitudinal axis that is parallel to the first longitudinal axis.

5. The electronic device of claim 4, wherein the portion of the first antenna arm comprises fourth and fifth segments, the gap is formed between the fourth segment and the second segment, the fifth segment couples the fourth segment to the grounding location, the third antenna arm comprises a sixth segment that extends from the third segment, and the sixth segment extends along a fourth longitudinal axis that is parallel to the second longitudinal axis.

6. The electronic device of claim 2, wherein the third antenna arm is coupled to the antenna ground, the antenna feed being coupled between the first antenna arm and the antenna ground.

7. The electronic device of claim 6, wherein the third antenna arm comprises an L-shaped strip.

8. The electronic device of claim 7, wherein the second antenna arm is configured to feed the L-shaped strip via near-field electromagnetic coupling.

9. The electronic device of claim 7, wherein the first antenna arm and the portion of the antenna ground run around a central opening at the surface, the L-shaped strip being located within the central opening.

10. The electronic device of claim 2, wherein the second frequency band is lower than the first frequency band, the third frequency band comprising frequencies that are greater than the first frequency band.

11. An antenna comprising:

an antenna ground;

a loop antenna resonating element configured to resonate in a first frequency band, wherein the loop antenna resonating element extends around a central opening;

an inverted-F antenna resonating element configured to resonate in a second frequency band, wherein a portion of the loop antenna resonating element forms a return path to the antenna ground for the inverted-F antenna resonating element;

an L-shaped antenna resonating element configured to resonate in a third frequency band, wherein the L-shaped antenna resonating element is disposed within the central opening of the loop antenna resonating element and has a proximal end connected to the antenna ground; and an antenna feed configured to feed the loop antenna resonating element, the inverted-F antenna resonating element, and the L-shaped antenna resonating element.

12. The antenna defined in claim 11, wherein the L-shaped antenna resonating element extends from a portion of the loop antenna resonating element.

13. The antenna defined in claim 12, wherein the L-shaped antenna resonating element extends from a portion of the loop antenna resonating element formed from the antenna ground.

14. The antenna defined in claim 11, wherein the first frequency band comprises 5 GHz, the second frequency band comprises 2.4 GHz, and the third frequency band comprises a frequency between 5 GHz and 9 GHz.

15. An antenna comprising:

an antenna ground;

a feed segment separated from the antenna ground by a first gap;

a first resonating element arm having a first segment extending from the feed segment, a second segment extending from the first segment at a non-parallel angle with respect to the first segment, and a third segment extending from the second segment to the antenna ground;

a second resonating element arm having a fourth segment extending from the first and second segments and having a fifth segment extending from the fourth segment at a non-parallel angle with respect to the fourth segment, wherein the fourth segment extends parallel to the second segment;

a second gap between the second segment and the fourth segment;

a third resonating element arm having a sixth segment coupled to the feed segment and having a seventh segment that extends from the sixth segment at a non-parallel angle with respect to the sixth segment; and an antenna feed having a positive antenna feed terminal coupled to the feed segment and having a ground antenna feed terminal coupled to the antenna ground, wherein the antenna feed is configured to feed the first, second, and third resonating element arms.

16. The antenna defined in claim 15, wherein the sixth segment extends from the feed segment parallel to the first segment.

17. The antenna defined in claim 16, wherein the seventh segment extends parallel to the fifth segment and is separated from the fifth segment by a third gap.

18. The antenna defined in claim 17, wherein the second resonating element arm has an eighth segment that extends from the fifth segment parallel to the third segment.

19. The antenna defined in claim 15, wherein the feed segment, the first segment, the second segment, the third segment, and a portion of the antenna ground form a loop antenna resonating element configured to radiate in a first frequency band, the second resonating element arm being configured to radiate in a second frequency band that is different from the first frequency band.

20. The antenna defined in claim 15, wherein the sixth segment is coupled to the feed segment at a location between the positive antenna feed terminal and the first segment.

* * * * *